United States Patent [19]

Lopez

[11] Patent Number: 4,530,600
[45] Date of Patent: Jul. 23, 1985

[54] VARIABLE ATTENUATOR FOR OPTICAL TRANSCEIVER

[75] Inventor: Marco A. Lopez, Anaheim, Calif.

[73] Assignee: Northrop Corporation, Hawthorne, Calif.

[21] Appl. No.: 351,028

[22] Filed: Feb. 22, 1982

[51] Int. Cl.³ .............................................. G01C 3/08
[52] U.S. Cl. ........................................... 356/5; 350/407
[58] Field of Search ................. 356/5; 350/407, 353, 350/266

[56] References Cited

U.S. PATENT DOCUMENTS

| | | | |
|---|---|---|---|
| 2,909,958 | 10/1959 | Hildebrand | 356/5 |
| 3,399,591 | 9/1968 | Drougard et al. | 88/14 |
| 3,422,370 | 1/1969 | Collins, Jr. | 331/94.5 |
| 3,520,592 | 7/1970 | Leib et al. | 350/150 |
| 3,575,490 | 4/1968 | Reisman | 356/160 |
| 3,622,220 | 10/1969 | Kogelnik | 350/3.5 |
| 3,704,997 | 12/1972 | Smith | 350/407 |
| 3,901,596 | 8/1975 | Vincent et al. | 356/5 |
| 4,006,426 | 2/1975 | Lacour | 330/4.3 |
| 4,081,760 | 3/1978 | Berg | 331/94.5 C |
| 4,091,412 | 5/1978 | Salonimer | 358/108 |
| 4,127,827 | 11/1978 | Barry | 331/94.5 C |
| 4,129,357 | 12/1978 | Frosch | 350/157 |
| 4,270,862 | 6/1981 | Hewitt | 356/5 |
| 4,391,515 | 7/1983 | Forrester et al. | 356/5 |

*Primary Examiner*—S. C. Buczinski
*Attorney, Agent, or Firm*—Terry J. Anderson; John E. Peele, Jr.

[57] ABSTRACT

A variable attenuator for optical transceivers such as laser rangefinders for ordnance control. A polarization rotation device, such as a mechanically rotatable half-wave plate or an electrooptic cell, operates in combination with a beam splitter polarizer to attenuate the transmitted laser beam by a continuously variable amount without further attenuating the received laser beam.

1 Claim, 5 Drawing Figures

VARIABLE ATTENUATOR FOR OPTICAL TRANSCEIVER

BACKGROUND OF THE INVENTION

1. Field of the Invention

The present invention relates to variable attenuators for optical transceivers such as laser rangefinders for ordnance control.

2. Description of the Prior Art

A laser rangefinder is an optical transceiver used for measuring the distance to a target. A laser rangefinder generally includes a laser transmitter for irradiating the target with pulses of polarized light, a photodetector for receiving the light reflected from the target, and a signal processor for measuring the time required for a light pulse to propagate to the target and back, thereby indicating the distance between the rangefinder and the target.

A desirable feature in a laser rangefinder is the ability to adjust the intensity of the laser beam transmitted to the target. For example, during training it is preferable to attenuate the beam so that personnel accidentally looking at it will not suffer eye damage. As another example, during combat it is advantageous to attenuate the laser beam to the minimum intensity required for reliable range measurements in order to minimize the detectability of the beam by the enemy. Since this minimum intensity depends on such variables as atmospheric conditions, target reflectivity and target distance, the ability to continuously adjust the attenuation over a wide range is desirable.

One known method of attenuating the beam transmitted by a laser transceiver is to insert in the beam transmission path an absorptive material or filter which allows only a small fraction of the incident light to be transmitted therethrough, the rest of the light energy being absorbed by the absorptive material and dissipated as heat. However, one disadvantage of this method is that the resulting heat can distort the filter so that it acts like a lens and disturbs the collimation of the transmitted beam. Another disadvantage of this method is that the absorptive filter imposes a fixed amount of attenuation with no provision for adjustment.

A known alternative to the preceding method is to position a partial reflector in the transmission path in place of the aforementioned absorptive filter, the reflector being designed to transmit only a small fraction of the incident light, the rest being reflected to where an absorptive material is positioned to absorb the reflected light. This alternative method overcomes the first shortcoming of the preceding method because the absorptive material is not in the path of the transmitted light. However, it still lacks any provision for adjusting the amount of attenuation produced by the reflector.

SUMMARY OF THE INVENTION

The present invention is an optical transceiver having means for controlling the intensity of the light transmitted toward a target. More specifically, the invention comprises a polarized light source, a beam splitter, and means positioned between the light source and the beam splitter for controllably rotating the polarization of the light and thereby controlling the intensity of the light propagating from the beam splitter toward the target. Two examples of suitable means for controllably rotating the light polarization are a mechanically rotatable half-wave plate and a birefringent electrooptic cell. Either means permits continuous adjustment of the transmitted beam intensity.

BRIEF DESCRIPTION OF THE DRAWINGS

FIG. 1 is a schematic diagram of a prior art laser transceiver.

DETAILED DESCRIPTION OF THE PREFERRED EMBODIMENTS

The present invention is an improvement over the prior art laser transceiver shown in FIG. 1. The illustrated prior art design uses a beam splitter polarizer to allow the transmitter and receiver portions of the transceiver to share the same focusing optics to ensure that the transmitter and receiver are aimed along the same sight line to the target.

Figure 1A:
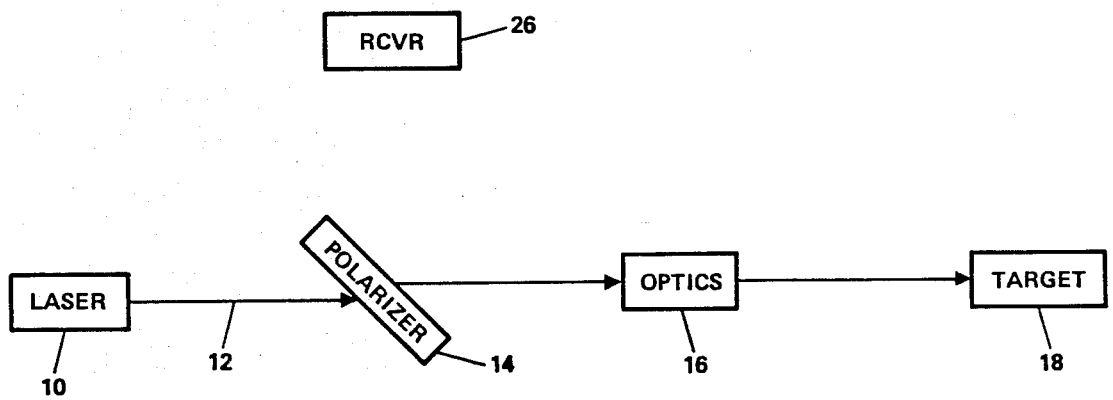
FIG. 1a shows the propagation path of the transmitted light.

More specifically, the prior art transceiver of FIG. 1a includes a laser 10 which emits a polarized light beam 12 and a beam splitter polarizer 14 whose polarization axis is parallel with that of the laser beam so that the polarizer appears transparent to the beam. The laser beam passes through the polarizer 14, is aimed and collimated by collimating optics 16, and propagates toward target 18.

Figure 1B:
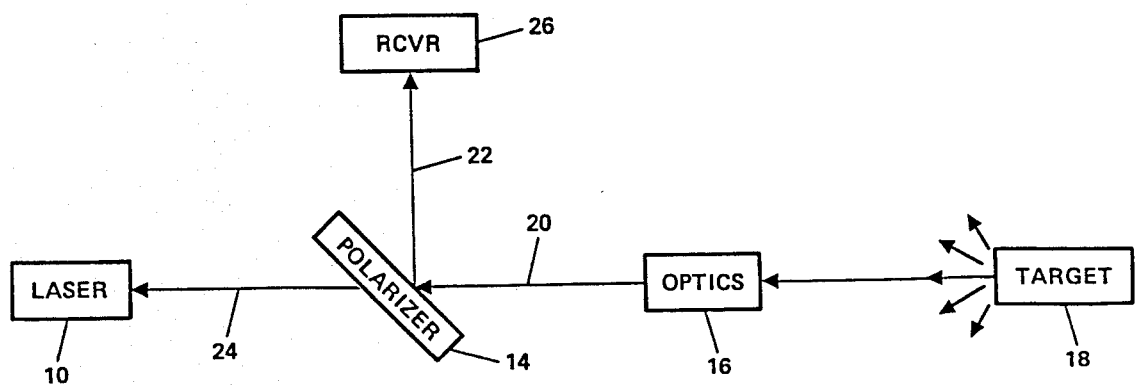
FIG. 1b shows the path of the reflected light received from the target.

Referring to FIG. 1b, when the laser beam impinges upon target 18, it is scattered and becomes nonpolarized. A portion 20 of the scattered light returns to the transceiver, passes through optics 16, and impinges upon beam splitter polarizer 14. The polarizer splits the nonpolarized light beam 20 into two equal magnitude components 22 and 24 which are polarized orthogonal and parallel, respectively, to the polarization axis of the polarizer. The first light beam component 22 is reflected by the polarizer toward photodetector 26, and the second light beam component 24 is transmitted through the polarizer and is lost.

Figure 2:
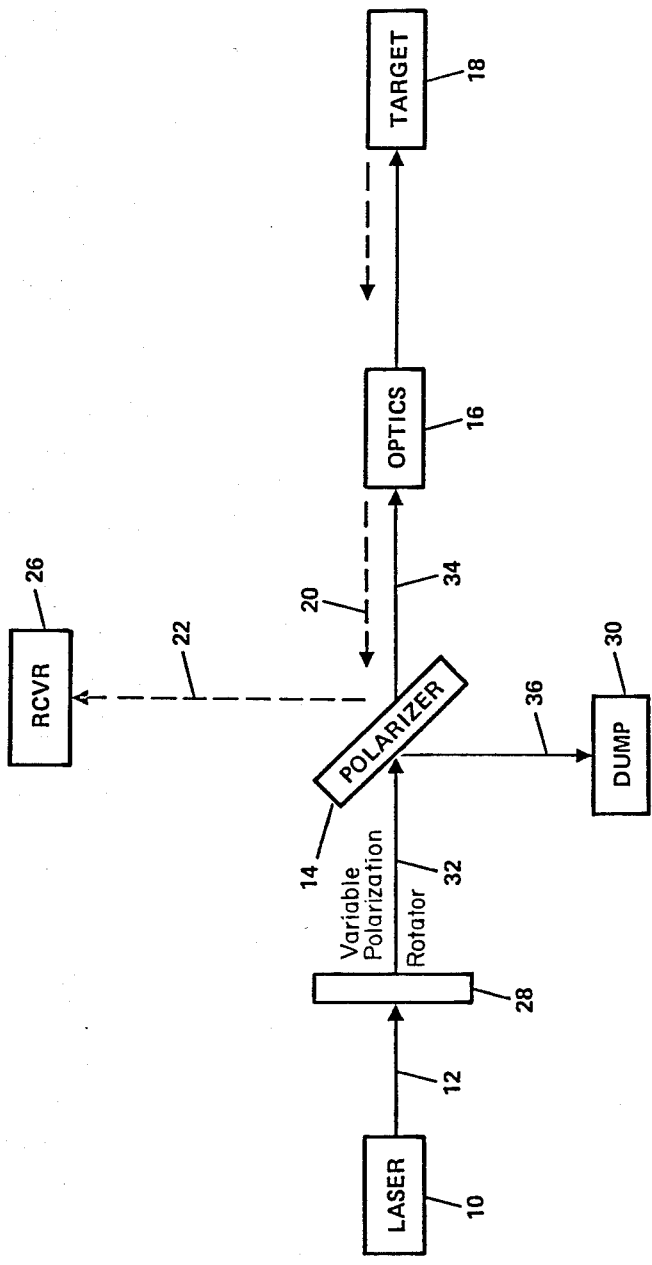
FIG. 2 is a schematic diagram of a preferred embodiment of the invention. The propagation paths of the transmitted light and the received light are shown by solid arrows and broken arrows, respectively.

As shown in FIG. 2, the present invention is an improvement over the prior art design of FIG. 1 including two additional elements, polarization rotation device 28 and absorptive material or "beam dump" 30.

As shown by the broken arrows in FIG. 2, the operation of the present invention in receiving reflected light from the target is the same as in the prior art transceiver. However, the operation of the invention in transmitting light to the target is quite different from the prior art.

Specifically, light source 10, preferably a laser, emits linearly polarized light 12 along an optical path toward beam splitter polarizer 14. Although the path is illustrated as straight, in practice the light beam may be bent or reflected by lenses or mirrors in the path.

A polarization rotation device 28 is positioned in the path between laser 10 and beam splitter polarizer 14. The rotation device rotates by a controllable amount the polarization of the light propagating therethrough, thereby controlling the polarization of the light beam 32 emerging from the rotation device 28 and incident upon the beam splitter polarizer 14.

Beam splitter polarizer 14 appears transparent to light having a certain polarization and appears reflective to light having the orthogonal polarization. Accordingly, beam splitter polarizer 14 splits the incident light beam 32 into first and second orthogonally polarized components 34 and 36 which are respectively transmitted through and reflected to one side of the polarizer 14. Beam splitter polarizer 14 preferably is planar so that, according to the familiar principle that the angle of incidence equals the angle of reflection, the paths of the light beams 32 and 36, respectively incident upon and reflected by the polarizer 14, are bisected by a line drawn perpendicular to the plane of the polarizer.

In the prior art design of FIG. 1, the polarization of the light beam 12 emitted from laser 10 is oriented parallel to the polarization axis of beam splitter polarizer 14 so that essentially all of the light consists of the first component 34 transmitted through the polarizer, and the orthogonal component 36 is negligible. However, in the present invention as shown in FIG. 2, polarization rotation device 28 determines the polarization of light beam 32 incident upon beam splitter polarizer 14, and hence determines the relative magnitudes of the two orthogonally polarized components 34 and 36.

Figure 3:
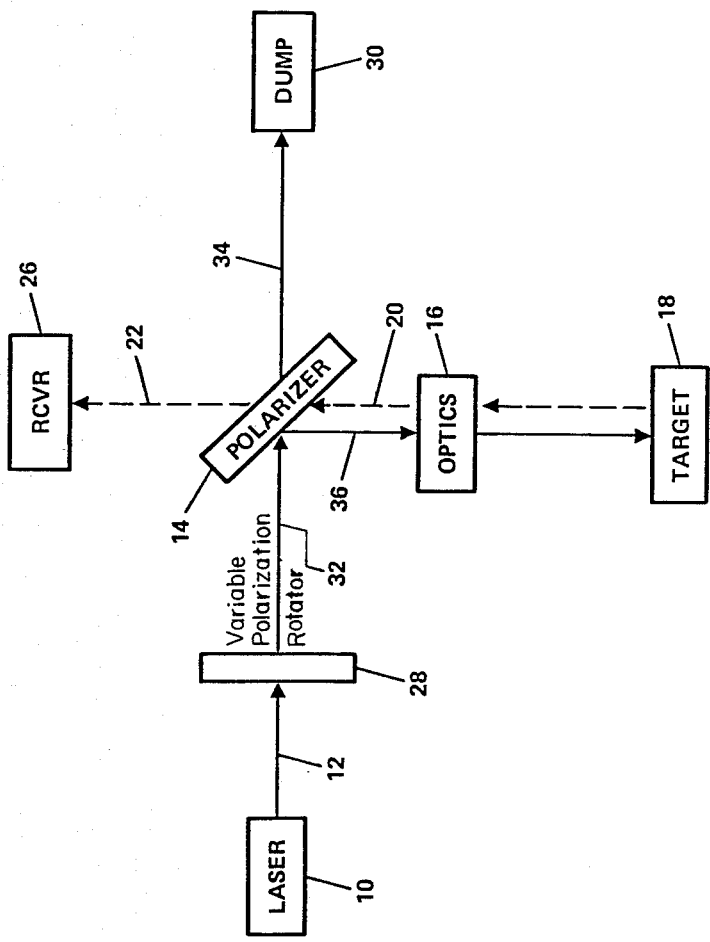
FIG. 3 is a schematic diagram of a variation of the embodiment shown in FIG. 2 in which the positions of the collimating optics and the absorber are interchanged.

Collimating optics 16 are positioned in the path of one of the two component beams 34 or 36 and operate to collimate the beam and aim it at the target 18. An absorptive material or "beam dump" 30 is positioned so as to intercept and absorb the other component beam, dissipating its energy as heat. In the embodiment shown in FIG. 2, the collimating optics 16 and the beam dump 30 are positioned in the paths of the first component beam 34 and the second component beam 36, respectively, so that the first beam 34 propagates toward the target 18 and the second beam 36 is absorbed. FIG. 3 illustrates an alternative embodiment wherein the collimating optics 16 and the beam dump 30 are interchanged so that the second component beam 36 is the one directed toward the target.

In summary, in the embodiment of FIG. 2, polarization rotation device 28 rotates the polarization of light beam 32 and thereby determines the relative magnitudes of the beam components 34 and 36 polarized parallel and perpendicular, respectively, to the polarization axis of polarizer 14. Since only the first component 34 is transmitted to the target 18, polarization rotation device 28 controls the intensity of the laser beam transmitted to the target.

The polarization rotation device 28 can be implemented by means of a birefringent material which may be mechanically or electrically controlled to vary the amount of polarization rotation it produces.

An example of a mechanically controlled polarization rotation device 28 is a birefringent half-wave plate rotatable about an axis parallel to the propagation path of the laser beam 12 and having its optic axis aligned perpendicular to the axis of rotation. If such a plate is rotated to a position in which its optic axis is parallel or perpendicular to the polarization direction of the laser beam 12, the laser beam will pass through the half-wave plate without undergoing any polarization rotation. If the half-wave plate is rotated from the just-described position by 45° so that its optic axis is at a 45° angle to the polarization direction of the laser beam 12, the polarization of the laser beam will be rotated by 90° as it passes through the half-wave plate. If the half-wave plate is rotated to an intermediate position, the laser beam will undergo an intermediate polarization rotation between 0° and 90°.

In the embodiment shown in FIG. 2, the laser 10 preferably produces a monochromatic laser beam 12 which is linearly polarized in a direction either parallel or perpendicular to the polarization axis of beam splitter polarizer 14. If the former polarization is employed, the entire laser beam will propagate through the polarizer 14 to the target 18 if the half-wave plate is adjusted so that it produces no rotation of the beam's polarization. As explained in the preceding paragraph, this is accomplished by rotating the half-wave plate so that its optic axis is either parallel or perpendicular to the polarization direction of the laser beam. If the half-wave plate is then progressively rotated from this position through a 45° angle in either direction, the intensity of the laser beam 34 transmitted to the target will progressively decrease to zero. Thus, the intensity of the transmitted laser beam 34 can be continuously adjusted from zero to the full intensity of the laser by adjusting the rotational positioq of the half-wave plate.

The preceding paragraph described the operation of an embodiment to which the laser 10 is oriented so that laser beam 12 is linearly polarized in a direction parallel to the polarization axis of beam splitter polarizer 14. If, on the other hand, the laser beam 12 is linearly polarized in the perpendicular direction, the preceding description will still apply, except that the rotational positions of the half-wave plate corresponding to zero and maximum intensities of the transmitted laser beam 34 will be interchanged.

As an alternative to the rotatable half-wave plate just described, the polarization rotation device 28 can be implemented by means of an electro-optic cell comprising a substance having a birefringence which varies in response to an applied electric or magnetic field. For example, such an electro-optic cell may be a conventional Kerr cell, Pockels cell, or nematic liquid crystal cell. The electrooptic cell preferably should be oriented with its optic axis at a 45° angle to the polarization direction of the laser beam 12. The cell then can be controlled to rotate the polarization of the laser beam by any amount from 0° to 90° by adjusting a voltage applied to the cell. The cell will produce a 90° polarization rotation when the applied voltage is such that the cell's birefringent retardation is an odd multiple of a half-wavelength, and will produce zero polarization rotation when the voltage is such that the retardation is a multiple of a wavelength. Intermediate voltage values will produce intermediate amounts of polarization rotation. Thus, the polarization rotation can be continuously varied from 0° to 90°, and hence the intensity of the beam transmitted to the target can be varied from zero to its maximum value, by adjusting the voltage applied to the electro-optic cell.

Another alternative implementation of the polarization rotation device 28 is a twisted nematic liquid crystal cell. Such a cell rotates the polarization of the light passing therethrough by an amount determined by the voltage applied to the cell. If a 90° twist cell is employed, the polarization rotation will vary progressively from 0° to 90° as the applied voltage is varied from zero to a maximum value, or vice versa.

Figure 4:
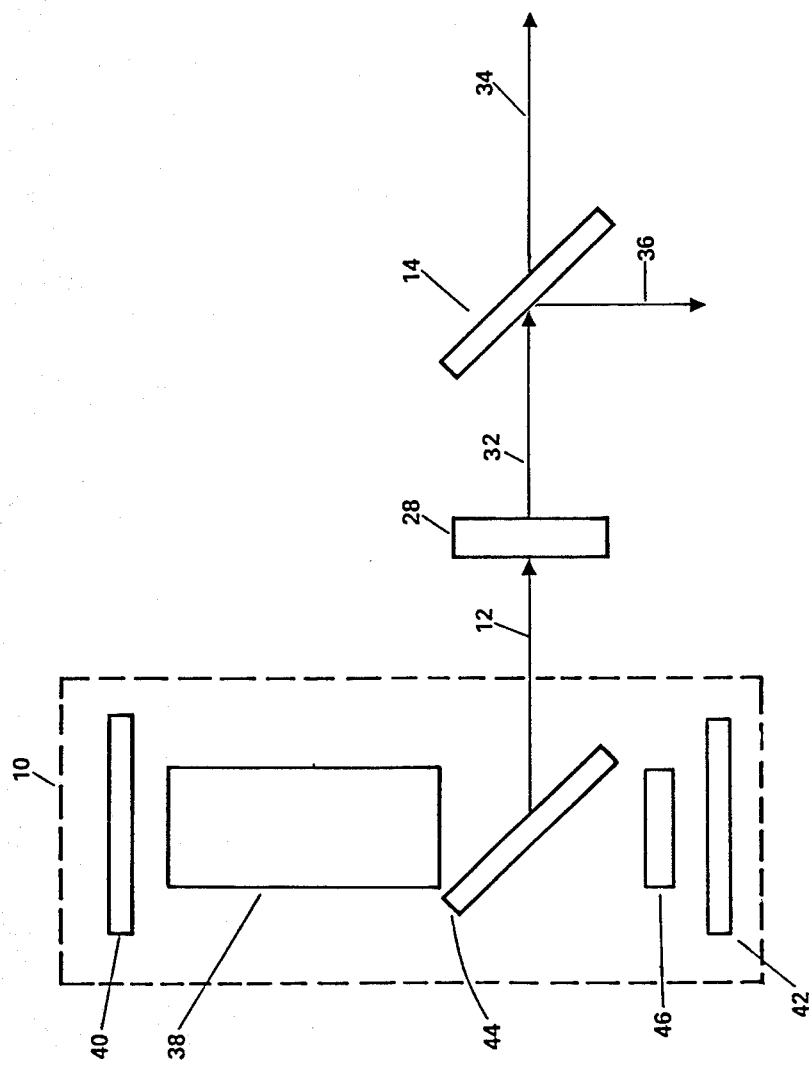
FIG. 4 is a schematic diagram of a preferred embodiment of the invention including a Q-switched laser.

Although the present invention may be used with any polarized light source 10, FIG. 4 shows the preferred construction of a Q-switched laser 10 as the light source. The laser 10 includes a gain medium 38 and two resonator reflectors 40 and 42 which define the endpoints of the laser cavity. The two resonator reflectors are more preferably porro prisms with orthogonal polarization axes.

A beam splitter polarizer 44 allows the laser beam 12 to be extracted from the laser cavity. A polarization rotation device 46, preferably a Pockels cell, performs the Q-switching by selectably rotating the polarization of the light passing therethrough by either zero or ninety degrees depending on a control voltage applied to the cell. While the light intensity in the laser cavity is building up, the Pockels cell 46 causes the polarization of the light to be parallel with the polarization axis of the beam splitter polarizer 44 so that the light is transmitted through polarizer 44 and continues to pass back and forth through the laser cavity. When the light intensity has built up to a predetermined maximum value, the Pockels cell control voltage is switched so that the Pockels cell 46 changes the polarization of the light by ninety degrees so as to be orthogonal to the polarization axis of beam splitter polarizer 44. The light is then reflected by the polarizer 44 and exits the laser as a pulsed laser beam 12.

The two beam splitter polarizers 14 and 44 preferably are parallel and are attached to a common mounting platform. This mounting method is a commonly used means for preventing vibrations from disturbing the directional stability of the target-directed laser beam 34. The polarization rotation device 28 can readily be constructed small enough to be mounted between the two polarizers 14 and 44 on the common platform.

I claim:

1. An optical transceiver arrangement for transmitting light toward a target and for receiving light from the target, and for controlling the intensity of the light transmitted toward the target, comprising:

a light source for generating coherent polarized light along a first optical path;

beam splitter means comprising a polarizer positioned in the first optical path for intercepting light generated from said coherent polarized light source, and for splitting the intercepted light into a first component beam for transmission in the direction of a target along a second polarized optical path, and into a second component beam for transmission along a third polarized optical path orthogonal to said first component beam in said second optical path;

absorbing means positioned to intercept the beam of said third optical path for absorbing the light therein and for converting and dissipating such light in the form of heat;

collimating optical means located within said second optical path for collimating the beam from said beam splitter means and for directing said beam onto said target, and for collecting and directing a component portion of light reflected by the target back along said second optical path and onto said beam splitter means for deflecting said reflected beam from said target into a fourth optical path orthogonal to said second optical path;

beam detection means located in said fourth optical path for detecting the intensity of the component beam reflected from said target and deflected by said beam splitter means; and adjustably rotatable polarization altering means positioned in the first optical path between the light source and the beam splitter means, for rotating by a controllable amount the polariztion of light passing therethrough, thereby controlling the relative intensities of the component beams of the light intercepted by the beam splitter means and of that light transmitted along said second optical path thereby reducing controllably the intensity of the light directed toward the target without further attenuation of the intensity of the light received by said beam detection means through said optical means.

* * * * *